United States Patent
Mulder et al.

(10) Patent No.: US 9,879,208 B2
(45) Date of Patent: Jan. 30, 2018

(54) METHOD OF PRODUCING A MASH EXTRACT AND AN APPARATUS FOR PERFORMING SUCH METHOD

(75) Inventors: Hendrikus Mulder, Uitgeest (NL); Onno Cornelis Snip, Rijswijk (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 1432 days.

(21) Appl. No.: 12/301,449

(22) PCT Filed: May 16, 2007

(86) PCT No.: PCT/NL2007/050216
§ 371 (c)(1),
(2), (4) Date: Feb. 13, 2009

(87) PCT Pub. No.: WO2007/136255
PCT Pub. Date: Nov. 29, 2007

(65) Prior Publication Data
US 2009/0226565 A1 Sep. 10, 2009

(30) Foreign Application Priority Data
May 19, 2006 (EP) .................................... 06114261

(51) Int. Cl.
*A23L 1/10* (2006.01)
*C12C 7/04* (2006.01)
(Continued)

(52) U.S. Cl.
CPC .................. *C12C 7/06* (2013.01); *C12C 7/04* (2013.01); *C12C 7/14* (2013.01)

(58) Field of Classification Search
USPC .................... 426/11, 12, 18, 28, 29, 30, 492
See application file for complete search history.

(56) References Cited

U.S. PATENT DOCUMENTS 4,140,799 A * 2/1979 Nagodawithana ...... C12C 11/02
426/11
4,343,233 A * 8/1982 Burgin .......................... 100/116
(Continued)

FOREIGN PATENT DOCUMENTS

DE        677 534 C     6/1939
DE        723 002 C     7/1942
(Continued)

OTHER PUBLICATIONS

Thesis by Dr. Richter, Chapter 9.5—Extract Losses, 8 pgs., with translation (7 pgs.).

*Primary Examiner* — Nikki H. Dees
*Assistant Examiner* — Amber M Cox
(74) *Attorney, Agent, or Firm* — Gilberto M. Villacorta; Sunit Talapatra; Foley & Lardner LLP (57) ABSTRACT

One aspect of the present invention relates to a method of producing a mash extract, said method comprising:
a. mashing particulate, starch-containing and optionally malted raw materials with a recirculated aqueous stream;
b. heating the mash and enzymatically hydrolysing the starch;
c. transferring the heat-treated mash into a first separator for separation into mash extract and spent grain;
d. transferring the spent grain into a first mixing vessel and mixing it with sparging water;
e. transferring the mixture of spent grain and sparging water into a second separator to remove spent grain;
f. recirculating an aqueous stream from the second separator to the mashing step,
wherein the gravity of the fermentable mash extract obtained from the first separator is maintained at above 15° P.
The present method offers the advantage that it is highly efficient in terms of energy consumption and extraction
(Continued)

yields. Furthermore, the present method achieves extremely high productivity in the operation of the brewhouse.

The invention also provides an apparatus for carrying out the aforementioned method.

15 Claims, 2 Drawing Sheets

(51) Int. Cl.
    *C12C 7/06*     (2006.01)
    *C12C 7/14*     (2006.01)

(56) References Cited

U.S. PATENT DOCUMENTS

| | | | | |
|---|---|---|---|---|
| 5,536,650 A | * | 7/1996 | Versteegh | C12C 5/004 426/16 |
| 5,762,991 A | * | 6/1998 | Dziondziak | C12C 7/00 426/11 |

FOREIGN PATENT DOCUMENTS

| | | |
|---|---|---|
| DE | 21 46 330 A1 | 3/1973 |
| DE | 24 50 636 A1 | 4/1975 |
| DE | 28 49 956 A1 | 5/1980 |
| DE | 42 44 596 C1 | 3/1994 |
| DE | 44 01 694 A1 | 7/1995 |
| EP | 1 281 751 A | 2/2003 |
| GB | 879 470 A | 10/1961 |

* cited by examiner

METHOD OF PRODUCING A MASH EXTRACT AND AN APPARATUS FOR PERFORMING SUCH METHOD

TECHNICAL FIELD OF THE INVENTION

The present invention is concerned with a method of producing a mash extract, especially a mash extract that is suitable for use in the production of a yeast fermented beverage such as beer. More particularly, the present invention provides a method comprising:
a. transferring a heat-treated mash into a first separator for separation into a stream of fermentable mash extract and spent grain;
b. transferring the spent grain into a mixing vessel and mixing it with sparging water;
c. transferring the mixture of spent grain and sparging water into a second separator to remove spent grain; and
d. recirculating an aqueous stream from the second separator to the mashing step.

The invention also relates to an apparatus for performing the aforementioned method.

BACKGROUND OF THE INVENTION

A mashing method as described above is disclosed in British patent GB-B 879 470. More specifically, said British patent describes a continuous method for the production of brewer's wort wherein heat-treated mash is introduced onto a first screen separator. The spent grains passing off the first screen separator drop into a first wash vessel where they are met and mixed with a very dilute wort originating from the screen separation of a grain slurry of a second wash vessel. The mixed slurry in the first wash vessel overflows onto a second screen separator. The dilute wort passing through the second screen separator is recirculated to the mashing step and the spent grains passing off the screen drop into the second wash-vessel where it is combined with a water stream. The slurry in second wash vessel overflows onto a third screen separator. The very dilute wort passing through the screen is pumped to the first wash vessel and the spent grains discharged from the screen go to spent grain disposal.

The method described in the British patent comprises continuously subjecting the solids fraction to counter-current extraction in a plurality of stages, each of which stages comprises reslurrying with wash effluent from a succeeding stage and mechanical separation of the coarse solids, to produce a substantially fully exhausted coarse solids waste. The examples of the British patent describe the results of three different production runs. The process wort streams produced in these runs had a specific gravity (S.G.) in the range of 1.04117 to 1.04484. These specific gravities equate to a gravity of about 10-11 degrees Plato (° P).

German patent application DE-A 42 44 596 describes a process for the production of alcohol free beer, wherein solid-liquid separation is achieved in a continuous fashion in a sequence of three decanters. Heat treated mash is introduced in a first decanter where it is separated in process wort and spent grain. The spent grain from the first decanter is transferred to a second decanter in which it is combined with dilute wort obtained from a third decanter. The dilute wort obtained from the second decanter is recirculated to the mashing step. The spent grain obtained from the second decanter is transferred to a third decanter in which it is combined with water. The exhausted spent grain obtained from the third decanter is discarded.

In the prior art beer brewing processes have been described that comprise the preparation of a high gravity mash extract. U.S. Pat. No. 4,140,799 describes a batch process for the preparation of an alcoholic beverage, comprising the steps of preparing an aqueous fermentable substrate containing fermentable carbohydrates and having a solids content in the range of 18° to 36° Plato. It is stated in the US patent that, in general, the wort is prepared by mashing malt with an adjunct, with the malt comprising from about 35% to 65% by weight of the total extract weight. The US patent teaches to reduce the solids content by dilution as soon as carbohydrate consumption rate during fermentation decreases as signified by foam collapse.

Furthermore, DE-A 44 01 694 describes a batch process for the preparation of filtered wort that uses recovered filter water to achieve enhanced concentration of the wort. The stated aim is to arrange the separation process with the mash filter in such a way that a final concentration, prior to concentration by evaporation, of more than 19 GG-% is achieved. Furthermore, it is observed in the German patent application that preferably the primary wort concentration is between 23 GG-% and 25 GG-%.

SUMMARY OF THE INVENTION

The inventors have developed a highly efficient method of producing a high gravity mash extract that may advantageously be operated in a continuous fashion. The present method is similar to the method described in British patent GB-B 879 470, but produces a mash extract with a much higher gravity. The present method enables the preparation of a high gravity mash extract without employing evaporation or adjuncts.

The present method offers the advantage that it is highly efficient in terms of energy consumption and extraction yields. Furthermore, the present method achieves extremely high productivity in the operation of the brewhouse.

DETAILED DESCRIPTION OF THE INVENTION

Accordingly, one aspect of the present invention relates to a method of producing a mash extract, said method comprising:
a. mashing particulate, starch-containing and optionally malted raw materials with a recirculated aqueous stream;
b. heating the mash and enzymatically hydrolysing the starch;
c. transferring the heat-treated mash into a first separator for separation into mash extract and spent grain;
d. transferring the spent grain into a first mixing vessel and mixing it with sparging water;
e. transferring the mixture of spent grain and sparging water into a second separator to remove spent grain;

f. recirculating an aqueous stream from the second separator to the mashing step,
wherein the gravity of the fermentable mash extract obtained from the first separator is maintained at above 15° P.

The term "mashing" as used herein refers to the admixing of starch-containing raw material, water and enzymes capable of hydrolysing starch. The latter enzymes may be provided by e.g. malt or by another enzyme source, e.g. a commercially available enzyme preparation containing starch degrading enzymes such as those found in malt, notably α-amylase, β-amylase and/or glucoamylase. Preferably, the enzymes are employed in the present method in the form of malt.

The term "separator" as used herein encompasses any device that can suitably be used to separate solids from liquids. Examples of separators that may suitably be used in the present method include: centrifuges, decanters, sedimentors, hydrocyclones, sieves, filters, membranes and presses. Naturally, combinations of different types of separators (e.g. decanters and sieves) may be employed in the present method. Preferably, the separators employed in the present process are selected from the group consisting of centrifuges, decanters and sieves. More preferably, the separators employed are selected from the group of centrifugal separators consisting of decanters and centrifuges. Most preferably, the separators employed are decanters.

It should be understood that wherever reference is made to a first separator, a second separator, a third separator etc., such first, second or third separator may actually comprises two or more separating devices that together perform the action of separating solids and liquid. These two or more separating devices may be operated in parallel and/or in series. For instance, it may be advantageous to employ a separator that consists of a series of sieves, wherein the pore size of the sieves decreases in the downstream direction. Likewise it can be advantageous to employ a sequence of centrifuges and/or decanter, wherein the centrifugal force applied increases in the downstream direction. It can also be advantageous to operate a number of separating devices in parallel, in particular if the process is operated in a continuous fashion. When run in parallel well below full capacity, failure or shutdown of one separating device does not necessitate interruption of the mash extraction process, meaning that the process can be operated uninterruptedly for prolonged periods of time.

Just like the separators, also the mixing vessels employed in the present process may actually consist of two or more mixing devices that are operated in series or in parallel.

It is known in the brewing industry to produce a fermentable mash extract with high gravity by incorporating a significant amount of adjunct (e.g. syrup), especially after enzymatic hydrolysis of the starch contained in the mash. These adjuncts can be used to provide high concentrations of fermentable sugars and consequently can be used to boost the gravity of the mash extract and wort. In the present method, high gravities can be achieved in the mash extract and wort without addition of fermentable sugars after enzymatic hydrolysis of the starch contained in the mash. Typically, less than 30 wt. %, preferably less than 10 wt. % of fermentable sugars in the mash extract and wort are derived from fermentable sugars added after hydrolysis of the starch contained in the mash. Most preferably, the mash extract and wort contain no fermentable sugars derived from fermentable sugars added after hydrolysis of the starch contained in the mash.

It is also known to increase the gravity of mash extracts or wort through evaporation. In the present process, preferably no concentration by means of evaporation is employed.

The advantages of the present method are particularly pronounced in case the gravity of the mash extract obtained from the first separator exceeds 18° P. More preferably the gravity of the mash extract exceeds 20° P, even more preferably it exceeds 25° P. In an especially preferred embodiment the gravity of the mash extract obtained from the first separator exceed 28° P, most preferably it exceeds 30° P.

Unexpectedly, it was found that despite the high gravity of the mash extract obtained in the present method, the extract loss observed in the method is typically less than 6 wt. %, preferably less than 5 wt. %, more preferably less than 4 wt. %, most preferably less than 3 wt. %. Preferably, the latter efficiencies are realised across the complete wort production process, including both mash separation and trub separation. The amount of extract loss in the production of a mash extract may suitably be determined by measuring the extract concentration in the liquid phase of the spent grain by a standard method for determining extract concentrations in wort (E.g. density measurement by Anton Paar). Because of the absence of free liquid in dewatered spent grains, said spent grains are conveniently extracted with hot water, following which the exhausted spent grains are separated by filtration. The extract losses can be calculated from the measured extract level in the extraction liquid, taking into account the amount of water added.

In particular if the present method employs a sequence of three or more separators, extract losses can be minimised very effectively. Accordingly, a preferred embodiment of the invention relates to a method as defined herein before, said method further comprising:
a. transferring the spent grain obtained from the second separator into a second mixing vessel and mixing it with sparging water;
b. transferring the mixture of spent grain and sparging water into a third separator to remove spent grain; and
c. recirculating the aqueous stream from the third separator as sparging water to the first mixing vessel.

The gravity of the aqueous stream obtained from the second separator typically is in the range of 1-10° P, preferably in the range of 1-8° P. The gravity of the aqueous stream obtained from the third separator is typically very low, indicating that the spent grain is essentially exhausted. Preferably, the gravity of the aqueous stream from the third separator is in the range of 0.1-2° P, more preferably in the range of 0.1-1.5° P. The gravities realised in the aqueous streams obtained from the second and third separator are strongly dependent on the extract concentration achieved in the primary mash extract.

In order to produce a high gravity mash extract with minimum extract losses it is preferred to recirculate the complete aqueous stream obtained from the second separator to the mashing step. In the mashing step, besides the aqueous stream from the second separator, also aqueous streams generated downstream of the brewhouse, e.g. from yeast washing, may be employed. Typically, the recirculated aqueous stream from the second separator constitutes at least 80 wt. %, preferably at least 90 wt. % of the total liquid employed in the mashing step. Most preferably, the recirculated aqueous stream from the second separator provides all the mashing liquid that is used in the mashing step.

The present method is particularly suitable for producing a malt extract that can be used in the production of a yeast-fermented malt beverages such as beer, ale, malt liquor, porter and shandy, especially an alcoholic or non-alcoholic bright beer.

Accordingly, the present method preferably comprises the additional steps of:

converting the optionally hopped mashed extract into wort by heating said mash extract to a temperature of at least 60° C. for at least 15 minutes;

removing organic volatiles from the hot wort by reducing pressure and/or by stripping it with a gas or steam. In a particularly preferred embodiment, the gravity of the mash extract is maintained at 15° or more, preferably at 18° or more, more preferably at 20° or more during these additional steps. Even more preferably said gravity is maintained at least 25° P, most preferably at least 30° P during these additional steps.

In the present process the mash extract is preferably converted into wort by heating said mash extract to 75-150° C. for 30 minutes up to 4 hours, preferably for 30 minutes up to 3 hours. The mash extract may suitably be converted into wort in a plug flow reactor.

The organic volatiles are removed from the hot wort by reducing pressure and/or by stripping it with a gas or steam. This is preferably done in a counter-current fashion. Most preferably, the organic volatiles are removed by stripping the hot wort with an inert gas or steam in a column equipped with a sieve plate geometry. Typically, the wort is maintained at a temperature of 95-110° C. when the organic volatiles are removed. The removal of the volatiles can suitably be achieved within 10 minutes, preferably it is achieved within 2 minutes.

The hot wort obtained after removal of organic volatiles contains a sludge consisting of proteins, protein-tannin complexes and hops, often referred to as trub. According to a preferred embodiment, after the removal of the volatiles, the trub is removed in a separator.

Examples of suitable separators include centrifuges, decanters, hydrocyclones, sedimenters, sieves and membrane filters. Preferably, the separator is selected from the group consisting of decanters, sedicanters and disc type centrifuges. Most preferably, the separator used is a disc type centrifuge. Typically, the separator is operated at a theoretical capacity factor value of at least 1,000 m², preferably of at least 2,500 m² and most preferably of at least 5,000 m² at a 1 m³/hr wort flow rate. Higher capacities can be scaled proportionally with the flow rate through the separator and the theoretical capacity factor.

The theoretical capacity factor (SIGMA value) of a centrifuge is calculated on the basis of the method described in "Solid-Liquid Separation", 2$^{nd}$ edition, 1981, by Ladislav Svarovsky, Butterworth-Heineman. The factor is calculated according to the following relation between: the number of discs (n), the gravitational acceleration (g), the angular speed ($\omega$), the angle of the discs with the vertical feed pipe ($\alpha$), the inner radius of the discs package ($r_1$) and the outer radius of the discs package ($r_2$).

$$\Sigma = \frac{\omega^2}{g} \frac{2}{3} \pi n (r_2^3 - r_1^3) \cot\alpha$$

According to a particularly preferred embodiment, following the removal of organic volatiles and hot break, the wort is diluted prior to being subjected to yeast fermentation. In the present method the wort is preferably diluted to a gravity of within the range of 10-35° P preferably to a gravity within the range of 10-30° P, prior to yeast fermentation. Typically, during dilution the gravity of wort is reduced by at least 2 degrees Plato, preferably by at least 4 degrees Plato and most preferably by at least 6 degrees Plato. Fermentation at high gravity, e.g. a gravity in excess of 35° P, is not practical as yeast growth and yeast metabolism are impaired at such high gravities. Dilution of the wort may occur before and/or after trub removal. Preferably, the wort is diluted after trub removal.

Dilution of the wort is achieved by combining the wort with an aqueous stream of lower gravity than said wort. It will be understood that such water stream may consist, for instance, of tap water or spring water. It is also within the scope of the present invention to employ aqueous effluent that has been obtained from a washing operation within the brewing process. In particular, it may be advantageous to combine the wort with an aqueous stream that is obtained from yeast washing.

Dilution of the wort is advantageously done by combining the still hot wort with water of a substantially lower temperature. This may be done in a continuous as well as a discontinuous fashion, the former being preferred. Typically, the wort from which the organic volatiles have been removed has a temperature in excess of 50° C., preferably in excess of 60° C., most preferably in the range of 70-100° C. when it is diluted.

The diluted wort so obtained can be fermented in a batch-wise or continuous manner. According to a particularly preferred embodiment fermentation of the diluted wort is achieved in a continuous fashion by:

a. feeding the diluted wort into a propagation vessel in which it is combined with a recirculated stream of yeast-containing residue and in which oxygen is supplied to initiate yeast growth;

b. feeding the wort from the propagation vessel into a sequence of one or more fermentation vessels in which the yeast is kept suspended;

c. feeding the fermented wort into one or more separators to remove a yeast-containing residue;

d. recirculating part of the yeast-containing residue to the propagation vessel; and e. feeding the remainder of the fermented wort to subsequent processing steps.

Typically, the original gravity of the combined streams of diluted wort and yeast-containing residue in the propagation vessel and the one or more fermentation vessels exceeds 12° P. Preferably, said original gravity is within the range of 15-35° P, more preferably within the range of 15-30° P.

In order to ensure that yeast growth occurs in the propagation vessel at a desirable high rate, oxygen must be supplied. This may be done by ensuring that the propagation vessel contains a headspace of air that is in open connection with surrounding atmosphere and by vigorously stirring the fermentation broth. Alternatively, oxygen or air may be introduced into the yeast-containing wort that is contained in the propagation vessel or it may be introduced into the wort stream or the recirculated stream of yeast containing residue prior to entry into the propagation vessel. In both cases the air or oxygen is advantageously distributed throughout the yeast-containing wort. This may be achieved by stirring, recirculation and/or by introducing the oxygen or air through a plurality of gas injectors. According to a particularly preferred embodiment, oxygen is supplied by introducing it into the wort stream prior to entry into the propagation vessel. This embodiment offers the advantage that the oxygen concentration can be controlled quite accurately. Oxygen is typically introduced in the yeast-containing wort in an amount of at least 8 ppm, preferably in an amount of 10-40 ppm, calculated on the main wort stream.

Typically, the residence time in the propagation vessel is within the range of 0.5-5 hours. The residence time in the propagation vessel can be calculated by dividing the operational volume of the propagation vessel by the wort flow rate to the propagation vessel. The operational volume of the propagation vessel equals the total volume of liquid that is contained in the vessel.

The recirculation of the yeast-containing residue in combination with oxygen supply make it possible to maintain high yeast concentrations in the propagation vessel Typically, the yeast content of the wort in the propagation vessel is maintained at more than 20 g/litre (based on wet yeast). According to a particularly preferred embodiment, the yeast concentration of the wort in the propagation vessel is within the range of 30-300 g/l (again based on wet yeast). Even more preferably, the yeast concentration of the wort in the propagation vessels is within the range of 50-200 g/l. The amount of wet yeast contained in a suspension equals the amount of yeast cake with a water content of 73% that may be isolated from the suspension by means of centrifugation. The aforementioned water content includes the water contained in the yeast cells. Advantageously, these yeast concentrations are maintained in the one or more fermentation vessels downstream of the propagation vessel. The use of high yeast concentration offers several important advantages, especially in terms of productivity and cost efficiency.

The temperature of the liquid within the propagation vessel is suitably maintained within the range of 5-40° C., preferably within the range of 6-25° C., more preferably within the range of 8-18° C. The propagation vessel may be operated under super-atmospheric pressure, especially if pressurised air or oxygen is introduced into the vessel. Preferably, the propagation vessel is operated at approximately atmospheric pressure.

In order to maximise efficiency, it should be ensured that the part of the yeast-containing residue that is not recirculated to the propagation vessel has been largely exhausted in that virtually all (green) beer has been removed therefrom. This may advantageously be achieved by washing the fermented wort and/or by washing the non-recirculated yeast-containing residue.

Typically, at least 20%, especially at least 40% of the yeast present in the fermented wort is removed from the fermented wort before it is subjected to clarification or, if it is not clarified, before it is packaged. Preferably, at least 60%, more preferably at least 80%, even more preferably at least 90% and most preferably at least 95% of the yeast present in the fermented wort is removed. Preferably, the yeast is removed by means of sedimentation.

The present method uses one or more fermentation vessels in which the yeast is kept suspended. Preferably, said yeast is not immobilised onto a carrier. The yeast is suitably kept suspended in the fermentation vessels by means of stirring, recirculation and/or carbon dioxide evolution.

Typically, the combined residence time in the one or more fermentation vessels is within the range of 5-80 hours. The combined residence time in the one or more fermentation vessels can be calculated by adding up the residence times within each of the fermentation vessels. The residence time within a fermentation vessel is calculated by dividing the total operational volume of the fermentation vessel by the wort flow rate to the fermentation vessel.

The temperature of the fermenting wort within the one or more fermentation vessels is suitably maintained within the range of 5-25° C., preferably within the range of 8-18° C., more preferably within the range of 10-15° C. According to a particularly preferred embodiment, the present method employs at least two fermentation vessels. The use of two or more fermentation vessels offers the advantage that higher substrate conversion rates can be achieved in the vessels preceding the last fermentation vessel. Typically, a sequence of not more than 4 fermentation vessels is employed. Most preferably, the present method employs a sequence of 2 or 3 fermentation vessels.

In the present method, the combined residence time in the propagation vessel and the one or more fermentation vessels typically does not exceed 80 hours. According to a preferred embodiment, said combined residence time does not exceed 40 hours. Most preferably, the combined residence time is within the range of 5-30 hours. These relatively short residence times may suitably be achieved by employing relatively high yeast concentrations as described herein before.

Fermentation of the diluted wort can be achieved in a batch-wise fashion by:
feeding the diluted wort into a tank or by feeding the undiluted wort into at tank and diluting it with water;
inoculating the wort with sufficient biologically active yeast; and
fermenting the wort to the desired final attenuation.

The oxygen required for yeast propagation may be provided by introducing oxygen or air into the tank holding the wort or by introducing oxygen or air in the diluted or undiluted wort prior to its introduction into the tank.

Following removal of yeast-containing residue from the fermented wort the green beer so obtained can be subjected to further processing. In the case of production of beer, the further processing preferably includes maturation, cold storage, clarification, carbonation and filling. Preferably, also this further processing is done in a continuous fashion.

Typically, the present method employs a maturation step following the removal of yeast cells from the fermentate. After fermentation, many undesirable flavours and aromas are present in the "green" or immature beer. Maturation (also sometimes referred to as ripening) reduces the levels of these undesirable compounds to produce a more palatable product. Preferably, the maturation step occurs in the present process prior to filtration, more preferably, prior to cold storage. Advantageously, maturation is achieved in the present method in a continuous fashion by feeding unmatured beer in the upper part of a vessel. The beer moves downwards and the yeast settles through the beer volume. The yeast is collected in the bottom of the vessel and above the yeast level, the matured beer is removed and fed into cold storage vessels. The beer remains at a cold temperature for a certain period to allow for coagulation and stabilisation of colloidal particles.

Maturation may also be achieved in a batch process by maturing the immature beer in a maturation vessel or in a fermenter. Following maturation, yeast is preferably removed. Next, the beer is transferred to cold storage tanks for stabilisation or it is cooled in the fermenter or maturation vessel.

Cold storage typically involves maintaining the fermentate at a temperature of less than 10° C., preferably of less than 5° C., more preferably of less than 2° C. for at least 12 hours, preferably for at least 24 hours. The aforementioned cold storage may be employed before and/or after maturation. According to a preferred embodiments said cold storage is applied after maturation and before filtration.

According to a particularly advantageous embodiment of the method as defined herein before, said method is operated in a fully continuous fashion. Continuous operation of the present method offers a number of significant advantages, including:

- higher productivity and lower investment: vessels can be operated for prolonged periods of time under full load, meaning that for equal production volume smaller vessels are needed than in a batch process;
- constant and better quality: process is easier to control due to possibility of adapting process parameters to local and instantaneous requirements and because steady-state-conditions are much more stable;
- high hygienic standard: continuous process is operated in a closed system.
- less energy: energy consumption is evenly spread, without major use peaks;
- less labour: operation of continuous process requires less attention
- less standstill and cleaning: continuous process can be operated at much longer runlengths than batch processes.

Another aspect of the invention relates to an apparatus for producing a fermentable mash extract, comprising:

- a feed device (1) for supplying a ground starting material to a first mixing device (2);
- the first mixing device (2) having an outlet which is connected to a heating unit (3) and an inlet for receiving an aqueous stream;
- the heating unit (3) being with its outlet connected to a first separator (4), having a first low solids outlet (5) for a relatively low solid fraction and a second high solids outlet (6) for a relatively high solids fraction, said first separator (4) being adapted to provide at its low solids outlet (5) an extract with a gravity exceeding 15° P, preferably 18° P, more preferably 20° P, the second outlet (6) being attached to a
- second mixing device (7) having an inlet for receiving an aqueous stream (8,15), an outlet of the second mixing device (7) being attached to
- a second separator (9) which is with its low solids outlet (11) connected to the inlet of the first mixing device (2).

Centrifugal separators such as decanters and centrifuges are particularly suited for producing a high gravity extract at the low solids outlet (5). Hence, according to a particularly preferred embodiment, the first separator (4) is a centrifugal separator.

In another preferred embodiment, the second separator (9) is with its high solids outlet (12) connected to a third mixing device (13),
- the third mixing device (13) having a water inlet (8) and having an outlet connected to a
- third separator (14) which is with its low solids outlet (15) connected to the inlet of the second mixing device (7).

The high gravity extract obtained from the low solids outlet (5) is advantageously heat processed to yield wort. Accordingly, in a preferred embodiment, the low solids outlet (5) of the first separator (4) is connected to an inlet of a second heating device (17).

Figure 1:
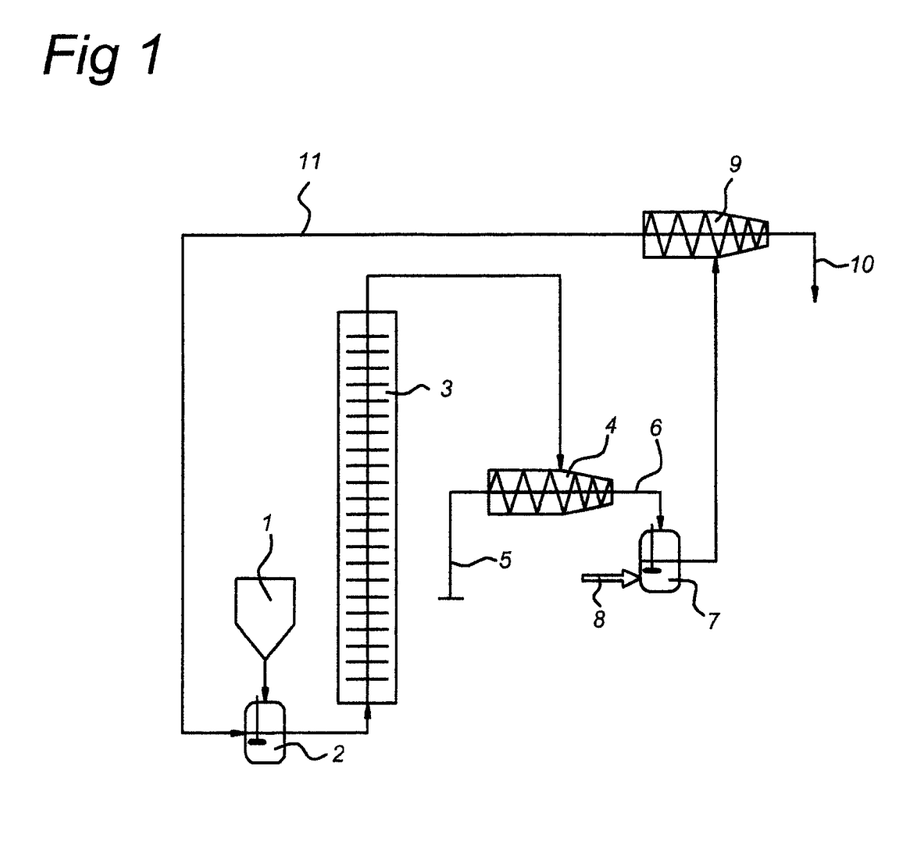
FIG. 1 is a diagram of an apparatus for continuous production of a high gravity mash extract using the method of the present invention, said apparatus employing two separators and a mixing vessel to produce the mash extract.

In the arrangement of the apparatus shown in FIG. 1, ground malt, is continuously fed from hopper 1 into mixing vessel 2, in which the ground malt is thoroughly mixed with the recirculated aqueous stream 11 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to the first separator 4, a decanter. In the first separator, the heat treated mash is separated into mash extract 5 and spent grain 6. The spent grain 6 is continuously transferred into the mixing vessel 7, where it is thoroughly mixed with a continuous supply of sparging water 8. The resulting slurry is transferred to the second separator 9, which is also a decanter. In the second separator 9 the slurry is separated into exhausted spent grain 10 and an aqueous stream 11 which is recirculated to the mixing vessel 2.

Figure 2:
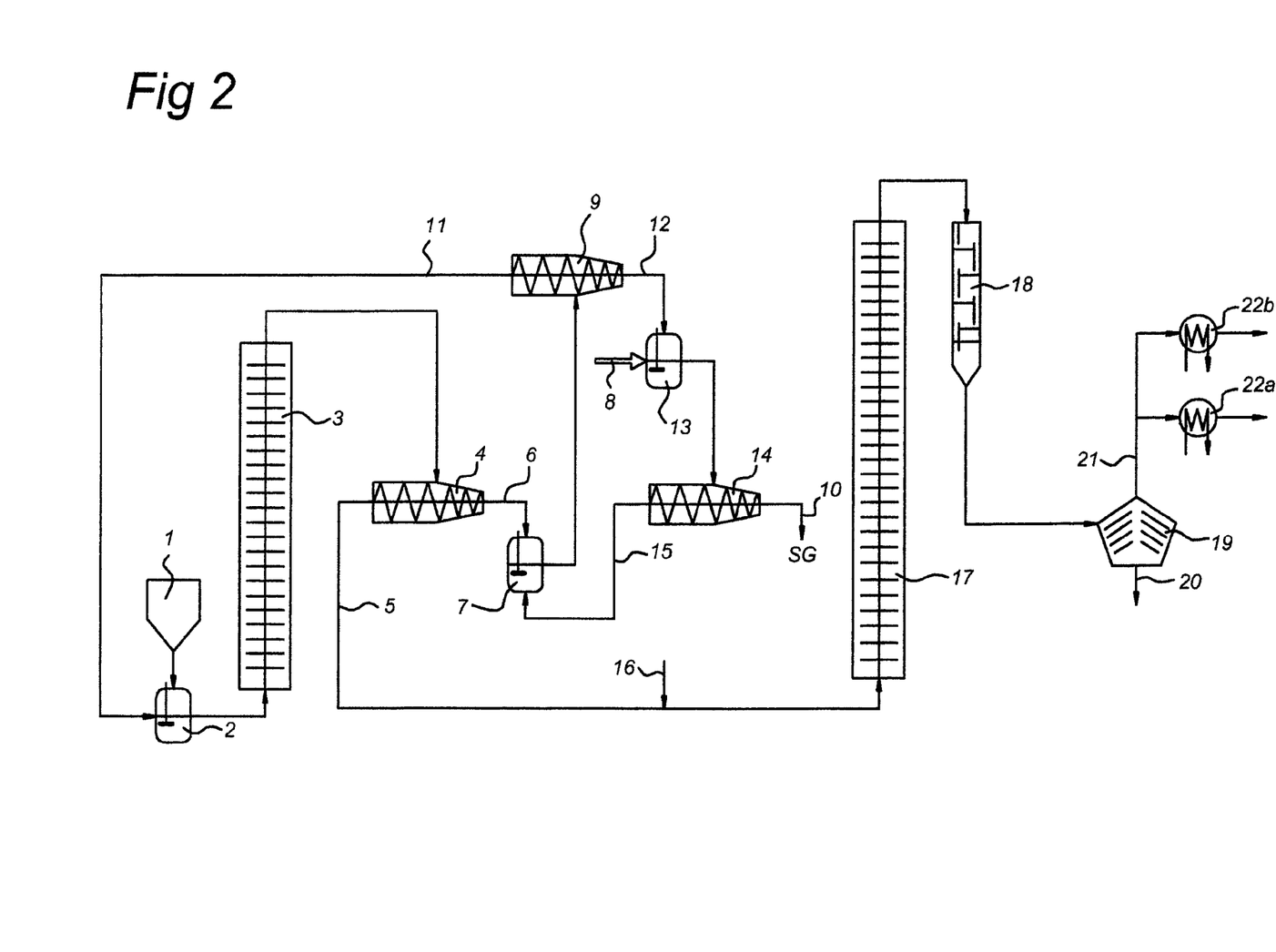
FIG. 2 is a diagram of an apparatus for continuous production of deodorised fermentable wort, wherein a high gravity mash extract is produced using the method of the present invention, said apparatus utilising three separators and two mixing vessels to produce the mash extract.

FIG. 2 shows an arrangement of an apparatus for carrying out the method of the present invention in which ground malt is continuously fed from hopper 1 into mixing vessel 2, in which the ground malt is thoroughly mixed with the recirculated aqueous stream 11 to produce a mash. The mash is continuously transferred from the mixing vessel 2 to the mashing tower 3 in which the mash is subjected to a heating regime that favours enzymatic degradation of the starch. The heat treated mash is fed from the mashing tower 3 to the first separator 4, a decanter. In the first separator, the heat treated mash is separated into mash extract 5 and spent grain 6. The spent grain 6 is continuously transferred into the mixing vessel 7, where it is thoroughly mixed with an aqueous stream 15. The resulting slurry is continuously transferred to the second separator 9, which is also a decanter. In the second separator 9 the slurry is separated into spent grain 12 and an aqueous stream 11 which is recirculated to the mixing vessel 2. The spent grain 12 is continuously transferred into the mixing vessel 13, where it is thoroughly mixed with a continuous supply of sparging water 8. The resulting slurry is transferred to the third separator 14, which is also a decanter. In the third separator 14 the slurry is separated into exhausted spent grain 10 and an aqueous stream 15 which is recirculated to the mixing vessel 7.

The mash extract 5, after addition of hop extract 16, is continuously introduced into a wort boiler 17 in the form of a plug flow reactor. The hot wort is fed from the wort boiler 17 into wort stripper 18 in which organic volatiles are removed by counter current stripping with steam. The deodorised hot wort leaving the wort stripper is introduced into centrifuge 19 to remove trub 20. The trub-free wort 21 is fed from the centrifuge 19 to two cooling units 22a and 22b in which the wort is cooled down, following which it can be fermented with yeast to produce beer.

The invention is further illustrated by means of the following examples.

EXAMPLES

Example 1

In six different production runs, a stream of 0.40-0.44 m³/hr of wort is produced with an extract concentration in the range of 13-31° P at the end of the wort production process. This wort is fermented, matured and stabilised in batch fermentors and subsequently continuously centrifuged and filtered.

The data of these different runs are given in table 1 including the malt input and water input flow rates. A detailed description of the production run is provided below.

At the front of the process, a recirculated aqueous stream of 50° C. is continuously mixed with 82-168 kg/hr hammer milled malt grist (screen size 1.5 mm). Both streams are fed into a continuous stirred tank reactor of 70 litre working volume at a temperature of 50° C. The residence time of this treatment is about 7 minutes and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the column, the mash is heated by heating jackets and the total reactor is insulated to minimise heat losses. The temperature profile is chosen such that the conversion of malt starch to fermentable sugars is appropriate for the product desired. The applied temperature profile in this example involves a protein rest at 50° C., followed by a saccharification rest at 67° C., and a mashing-off temperature of 78° C. The mash has a total residence time inside the column of 76 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 3500 rpm and a differential screw speed of 3 rpm. This decanter has a theoretical capacity factor value of 1700 m$^2$.

The theoretical capacity factor (SIGMA value) of a decanter is calculated according to the following relation between: the length of the cylindrical bowl (L), the gravitational acceleration (g), the angular speed ($\omega$), the radius of the dam ring or overflow ring ($r_1$) and the radius of the cylindrical bowl ($r_2$).

$$\Sigma = \frac{\varpi^2}{g}\pi L\left(\frac{3}{2}r_2^2 + \frac{1}{2}r_1^2\right)$$

The product (mash extract) is discharged from the first decanter to the next unit operation (boiling) and the spent grains are released into a small continuous stirred tank reactor. In the latter, 380-470 l/hr washing water of 80° C. is applied and with a residence time of 13 minutes, spent grains particles and water are homogeneously mixed.

The liquid phase of the resulting mixture is separated by a second decanter operating at similar settings as the first one (2 rpm differential screw speed, 4000 rpm, theoretical capacity factor of 1800 m$^2$). The clarified liquid supernatant is recirculated to the aforementioned mashing-in vessel. The product stream from the first decanter has an extract concentration of 13-31° P. Both decanters were equipped with a centrifugal fan and consequently work as a pump on the supernatant outlet.

The product from the mash separation is now referred to as wort and has a flow rate of 0.4-0.44 m$^3$/hr. Hop extract is dosed continuously in-line at a rate of 140 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m$^3$ and the residence time is typically 2.5 hours. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 15 kg/h and at atmospheric conditions at the top of the stripper. The wort leaving the bottom of the stripper is fed into a small buffer with negligible dimensions and directly fed into a centrifuge of the discontinuously discharge type. This machine has a rotational speed of 7400 rpm and a theoretical capacity factor of 13000 m$^2$.

Next, cooling of the wort takes place in two parallel plate and frame wort coolers that lower the wort temperature from 95-100° C. to 8° C. by a two stage water-glycol set-up.

A total volume of 2.2 m$^3$ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer is stabilised with the usual dosings of PVPP and the necessary PVPP filtration. Finally, the beer was packaged in suitable containers (glass bottle).

TABLE 1

Settings and extract losses for the production runs

| run number | | 1 | 2 | 3 | 4 | 5 | 6 |
|---|---|---|---|---|---|---|---|
| malt dosing rate | kg/h | 82 | 103 | 142 | 167 | 165 | 168 |
| water dosing rate | kg/h | 466 | 426 | 416 | 391 | 382 | 384 |
| extract loss in spent grains | % | 1.3 | 2.1 | 2.5 | 2.8 | 3.4 | 3.2 |
| extract concentration in wort | % (w/w) | 12.7 | 19.0 | 25.5 | 29.1 | 29.5 | 30.8 |

Example 2

In a production run, a stream of 0.75 m$^3$/hr of wort is produced with an extract concentration of 22.6±0.5° P at the end of the wort production process. This wort is fermented, matured and stabilised in batch fermentors and subsequently continuously centrifuged and filtered. A detailed description of the production run is provided below.

At the front of the process, a recirculated aqueous stream of approximately 750 l/hr having a temperature of 58° C. is continuously mixed with a stream of 230 kg/h hammer milled malt grist (screen size 1.5 mm). Both streams are fed into a continuous stirred tank reactor of 70 litre working volume at a temperature of 50° C. The residence time of this treatment is about 4 minutes and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the first column, the mash is heated by heating jackets and the total reactor is insulated to minimise heat losses. The temperature profile is chosen such that the conversion of malt starch to fermentable sugars is appropriate for the product desired. The applied temperature profile in this example involves a protein rest at 58° C., followed by a saccharification rest at 67° C., and a mashing-off temperature of 78° C. The mash has a total residence time inside the reactors of 60 minutes and the resulting mash is fed into the mash separation section.

Separation of the malt husks and other solids from the mash is done by three decanters. These decanters are scroll type bowl centrifuges with a continuous discharge of clarified liquid and thickened spent grains. The first decanter operates at a rotational speed of 3500 rpm and a differential screw speed of 3 rpm. This decanter has a theoretical capacity factor value of 1700 m². The product (mash extract) is discharged to the next unit operation (boiling) and has an extract concentration of 23.4±0.2° P. The spent grains are released from the first decanter into a first small continuous stirred tank reactor, in which a recirculated stream of washing liquid originating from a downstream decanter (third decanter) is fed, said recirculated stream having an extract concentration of 1.1° P. With a residence time of 10 minutes in this reactor, spent grains particles and water are homogeneously mixed to achieve an extract concentration of 5.3±0.1° P.

This extract is recovered by feeding this mixture into a second decanter operating at 4000 rpm, theoretical capacity factor of 1800 m²). The clarified liquid supernatant is recirculated to the aforementioned mashing-in vessel. Both decanters were equipped with a centrifugal fan and consequently work as a pump on the supernatant outlet. The spent grains obtained from the second decanter are fed into a second continuously stirred tank reactor in which 675 l/hr washing water of 80° C. is fed. The resulting extract concentration is as low as 1.1° P. The mixture is finally separated in a third decanter, yielding an aqueous stream that is re-used as washing liquid in the first stirred washing vessel and a dewatered spent grains stream containing 31% w/w dry matter.

The third decanter is significantly smaller compared to the first and second decanter and has a differential screw speed of 10 rpm, a bowl rotational speed of 5000 rpm, and a theoretical capacity factor of 500 m². The overall extract losses achieved in this decanter separation are as low as 1.0±0.2% on a malt infeed basis.

The product from the mash separation is now referred to as wort and has a flow rate of 0.75 m³/hr. Hop extract is dosed continuously in-line at a rate of 140 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m³ and the residence time is 80 min. Typical reactions taking place in this reactor are: protein denaturation and coagulation, sterilisation, hop isomerisation, colour formation, dimethyl-sulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 15 kg/h and at atmospheric conditions at the top of the stripper. The wort leaving the bottom of the stripper is fed into a small buffer with negligible dimensions and directly fed into a centrifuge of the discontinuous discharge type. This machine has a rotational speed of 7400 rpm and a theoretical capacity factor of 13000 m². The discharge frequency is set at 1200 sec. Extract losses have been quantified at 1.4±0.1% by collecting the trub and measurement of extract concentration and amount of trub.

Next, cooling of the wort takes place in two parallel plate and frame wort coolers that lower the wort temperature from 95-100° C. to 8° C. by a two stage water-glycol set-up.

A total volume of 2.2 m³ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer is stabilised with the usual dosings of PVPP and the necessary PVPP filtration. Finally, the beer was packaged in suitable containers (glass bottle).

Example 3

In a production run, a stream of 1.0 m³/hr wort with an extract concentration of 24.5±0.2° P was produced after mash separation. This stream was subsequently diluted after the boiling process resulting in a final wort stream of 1.4 m³/hr of wort with an extract concentration of 17.9±0.1° P. This wort is fermented, matured and stabilised in batch fermentors and subsequently continuously centrifuged and filtered. A detailed description of the production run is provided below.

At the front of the process, a recirculated aqueous stream of approximately 920 l/hr having a temperature of 55° C. is continuously mixed with a stream of 332 kg/hr hammer milled malt grist (screen size 1.5 mm). Both streams are fed into a continuous stirred tank reactor of 70 litre working volume at a temperature of 55° C. The residence time of this treatment is 4 minutes and serves the usual breakdown of proteins in the malt and allows for the dissolution and the degradation of glucans and related components.

Hereafter, the mixture, referred to as 'mash', is fed into a vertical cylindrical plug flow reactor. This reactor type has been described in earlier patents by Heineken (WO 92/12231). At certain heights in the first column, the mash is heated by direct steam injection and the total reactor is insulated to minimise heat losses. The temperature profile is chosen such that the conversion of malt starch to fermentable sugars is appropriate for the product desired. The applied temperature profile in this example involves a protein rest at 55° C., followed by a saccharification rest at 67° C., and a mashing-off temperature of 78° C. The mash has a total residence time inside the reactors of 55 minutes and the resulting mash is fed into the mash separation section.

Separation of the malt husks and other solids from the mash is done by two decanters. These decanters are scroll type bowl centrifuges with a continuous discharge of clarified liquid and thickened spent grains. The first decanter operates at a rotational speed of 4000 rpm and a differential screw speed of 4 rpm. This decanter has a theoretical capacity factor value of 2275 m². The product (mash extract) is discharged from the first decanter to the next unit operation (boiling) at a mass flow rate of 1014 kg/h and contains an extract concentration of 24.5±0.2° P. Spent grains with a dry matter content of 24.5±0.9% are released from the first decanter into a small continuous stirred tank reactor. In the latter, 940 l/hr washing water of 80° C. is introduced and with a residence time of 8 minutes, spent grains particles and water are homogeneously mixed.

The liquid phase of the resulting mixture is separated by a second decanter operating at 2 rpm differential screw speed, 4000 rpm, theoretical capacity factor of 1800 m²). The clarified liquid supernatant is recirculated to the aforementioned mashing-in vessel and the spent grains are discharged with a dry matter content of 28.8±0.4%. Both decanters were equipped with a centrifugal fan and consequently work as a pump on the supernatant outlet.

The product from the mash separation is now referred to as wort and has a flow rate of 1 m$^3$/hr. Hop extract is dosed continuously in-line at a rate of 140 g/hr and the mixture is heated to a temperature of 102° C. by direct steam injection. By the positive head of the first decanter, the wort is pumped into a plug flow reactor. This column reactor has the same characteristics as the earlier described mashing conversion column. The volume of this reactor is 1 m$^3$ and the residence time is 62 min. Typical reactions taking place in this reactor are: protein denaturation and coagulation, sterilisation, hop isomerisation, colour formation, dimethylsulphide (DMS) production from its malt-based precursor (S-methylmethionine).

The wort is thereafter treated in a sieve-plate geometry stripping column earlier described in Heineken patent (WO 95/26395). Steam of 1.5 bar is used in countercurrent operation to remove undesirable flavour compounds (mainly DMS) at a flow rate of 15 kg/h and at atmospheric conditions at the top of the stripper.

The wort leaving the bottom of the stripper is fed into a small buffer with negligible dimensions and mixed with a stream of hot water at 80° C. to achieve the final gravity of 17.9±0.1° P. This diluted product is fed into a centrifuge of the discontinuous discharge type. This machine has a rotational speed of 7400 rpm and a theoretical capacity factor of 13000 m$^2$. Extract losses observed during this wort production process are limited to 3.0±0.2% on the decanters and 1.6±0.1% on the separator, yielding an overall extract loss of 4.6±0.2%.

Next, cooling of the wort takes place in two parallel plate and frame wort coolers that lower the wort temperature from 95-100° C. to 8° C. by a two stage water-glycol set-up.

A total volume of 2.2 m$^3$ cooled wort is continuously fed into a cylindrical/conical fermentation tank together with active yeast in a concentration of 2.5 g/l. Continuous oxygenation is achieved by in-line aeration. The primary batch fermentation was performed at 10° C. and when the extract concentration reached 6.5° P, temperature was allowed to increase to 13° C. After the diacetyl concentration was reduced to a level of 30 ppm, the contents of the tank were cooled to −1.5° C. in 24 hours. This cold phase was maintained for 6 days.

The beer was then filtered over a kieselguhr bright beer filter of the vertical disc type. After this filtration, the beer is stabilised with the usual dosings of PVPP and the necessary PVPP filtration. Finally, the beer was packaged in suitable containers (glass bottle).

The invention claimed is:

1. A method of producing a mash extract comprising:
   a. mashing particulate, starch-containing and optionally malted, raw materials with mashing liquid comprising a recirculated aqueous stream to provide a mash;
   b. heating the mash and enzymatically hydrolysing the starch;
   c. transferring the mash from step b. into a first separator for separation into mash extract and spent grain, said mash extract having a gravity that exceeds 20° P;
   d. transferring the spent grain into a first mixing vessel and mixing the spent grain with sparging water;
   e. transferring the mixture of spent grain and sparging water into a second separator to remove spent grain to produce an aqueous stream;
   f. recirculating an aqueous stream from the second separator to the mashing step,
   g. heating the mash extract to a temperature of 75-150° C. for 30 minutes to 4 hours to provide a wort,
   h. removing organic volatiles from the wort while maintaining the wort at a temperature of 95-110° C. by reducing pressure and/or stripping with a gas or steam; and
   i. reducing the gravity of the wort by at least 2° P to a gravity within the range of 10-35° P by combining the wort with an aqueous stream of lower gravity than the wort;
   wherein the mash extract is maintained at a gravity of 15° P or more during steps (g) and (h), and
   wherein less than 10 wt. % of fermentable sugars is added to the mash extract after hydrolysis and wherein the mash extract is not concentrated by evaporation.

2. The method according to claim 1, wherein the gravity of the mash extract obtained from the first separator exceeds 25° P.

3. The method according to claim 2, wherein the gravity of the mash extract obtained from the first separator exceeds 28° P.

4. The method according to claim 1, wherein the gravity of the mash extract obtained from the first separator exceeds 22° P.

5. The method according to claim 1, wherein the mash extract is produced with an extract loss of less than 6 wt. %.

6. The method according to claim 5, wherein the mash extract is produced with an extract loss of less than 3 wt. %.

7. The method according to claim 1 further comprising:
   i. transferring the spent grain obtained from the second separator into a second mixing vessel and mixing the spent grain with sparging water;
   ii. transferring the mixture of spent grain and sparging water into a third separator to remove the spent grain; and
   iii. recirculating the aqueous stream from the third separator as sparging water to the first mixing vessel.

8. The method according to claim 1, wherein the first and/or second separator is selected from the group consisting of centrifuges, decanters, sedimentors, hydrocyclones, sieves, filters, membranes and presses.

9. The method according to claim 1, wherein the gravity of the mash extract is maintained at 18° P or more during steps (g) and (h).

10. The method according to claim 9, wherein the gravity of the mash extract is maintained at 20° P or more during steps (g) and (h).

11. The method according to claim 1, wherein said method is operated in a fully continuous fashion.

12. The method according to claim 1, wherein the first separator is operated at a theoretical capacity factor value of at least 1,000 m$^2$.

13. The method according to claim 12, wherein the first mixing vessel is a continuous stirred tank reactor, and wherein the sparging water is supplied at a rate from 384 to 416 L/hr.

14. The method according to claim 12, wherein the second separator is operated at a theoretical capacity factor value of at least 1,000 m$^2$.

15. The method according to claim 1, wherein the step of heating the mash further comprises:
   i. applying a protein rest to the mash between 50 and 58° C.;
   ii. applying a saccharification rest to the mash at 67° C.; and iii. heating the mash to a mashing-off temperature of 78° C.

* * * * *